US011113248B2

(12) United States Patent
Abbott et al.

(10) Patent No.: US 11,113,248 B2
(45) Date of Patent: *Sep. 7, 2021

(54) GENERATING AND SHARING METADATA FOR INDEXING SYNCHRONIZED CONTENT ITEMS

(71) Applicant: Dropbox, Inc., San Francisco, CA (US)

(72) Inventors: Graham Abbott, San Francisco, CA (US); Todd Dabney, San Francisco, CA (US); George Milton Underwood, IV, Palo Alto, CA (US)

(73) Assignee: Dropbox, Inc., San Francisco, CA (US)

( * ) Notice: Subject to any disclaimer, the term of this patent is extended or adjusted under 35 U.S.C. 154(b) by 169 days.

This patent is subject to a terminal disclaimer.

(21) Appl. No.: 16/380,523

(22) Filed: Apr. 10, 2019

(65) Prior Publication Data
US 2019/0236052 A1 Aug. 1, 2019

Related U.S. Application Data (63) Continuation of application No. 14/089,630, filed on Nov. 25, 2013, now Pat. No. 10,303,658.

(51) Int. Cl.
G06F 16/178 (2019.01)
G06F 16/176 (2019.01)

(52) U.S. Cl.
CPC .......... *G06F 16/178* (2019.01); *G06F 16/176* (2019.01)

(58) Field of Classification Search
None
See application file for complete search history.

(56) References Cited

U.S. PATENT DOCUMENTS

| 8,504,519 | B1 | 8/2013 | Sachs et al. |
| 2002/0033844 | A1 | 3/2002 | Levy |
| 2002/0188735 | A1 | 12/2002 | Needham et al. |
| 2004/0064568 | A1* | 4/2004 | Arora ................. H04L 67/1059 709/228 |

(Continued)

FOREIGN PATENT DOCUMENTS

WO    WO 2013/054196 A2    4/2013

OTHER PUBLICATIONS

Cripe B, "Folksonomy, Keywords, & Tags: Social & Democratic User Interaction in Enterprise Content Management," Oracle Content Management and Folksonomy, Jul. 1, 2007, XP055651258, Retrieved from the Internet: URL: http://www.oracle.com/US/solutions/oraclesocialtaggingwhitepaper-129389.pdf on Dec. 10, 2019, pp. 1-30.

(Continued)

*Primary Examiner* — Aleksandr Kerzhner
*Assistant Examiner* — Eddy Cheung
(74) *Attorney, Agent, or Firm* — Hickman Becker Bingham Ledesma LLP (57) ABSTRACT

Generating and sharing metadata for indexing synchronized content items. A server generates metadata for indexing synchronized content items and manages sharing of the metadata with client devices in accordance with user preferences that may be embodied in metadata generation and sharing management rules. For example, a content item stored at the server has been designated to be synchronized across at least a first client. The server generates metadata for indexing the content item and sends the metadata to at least a second client.

17 Claims, 3 Drawing Sheets

(56) References Cited

U.S. PATENT DOCUMENTS

| | | |
|---|---|---|
| 2006/0212469 A1 | 9/2006 | Babanov |
| 2006/0248067 A1 | 11/2006 | Brooks |
| 2007/0156897 A1 | 7/2007 | Lim |
| 2007/0174246 A1 | 7/2007 | Sigurdsson |
| 2007/0192684 A1* | 8/2007 | Bodin .................. G06F 16/437 715/234 |
| 2008/0059631 A1 | 3/2008 | Bergstrom |
| 2008/0288453 A1 | 11/2008 | Smetters |
| 2009/0100096 A1 | 4/2009 | Erlichson |
| 2009/0327302 A1 | 12/2009 | Richardson et al. |
| 2010/0088394 A1 | 4/2010 | Barbieri |
| 2010/0185664 A1 | 7/2010 | Baggott |
| 2010/0223400 A1 | 9/2010 | McCarthy |
| 2011/0078114 A1 | 3/2011 | Herbeck |
| 2011/0276396 A1 | 11/2011 | Rathod |
| 2012/0331108 A1 | 12/2012 | Ferdowsi et al. |
| 2013/0097687 A1 | 4/2013 | Storm |
| 2014/0032538 A1 | 1/2014 | Arngren |
| 2014/0032562 A1 | 1/2014 | Arngren |
| 2014/0188803 A1* | 7/2014 | James ................. G06F 11/1451 707/638 |
| 2014/0366068 A1 | 12/2014 | Burkitt |
| 2015/0007020 A1 | 1/2015 | Tiu |
| 2015/0127607 A1 | 5/2015 | Savage |

OTHER PUBLICATIONS

Drago I., et al., "Inside Dropbox: Understanding Personal Cloud Storage Services," Proceedings of the 2012 ACM Conference on Internet Measurement Conference, IMC, XP055131706, Nov. 14, 2012, vol. 16, 14 pages.

European Summons to Attend Oral Proceedings Pursuant to Rule 115(1) EPC for EP Application No. 14755462.0 dated Dec. 17, 2019, 8 pages.

ip.com, Method and System for Automatic Metadata Extraction and Question Answering in a File Sharing Application, Dec. 21, 2010, Prior Art Database, ip.com Journal, ip.com Inc, XP013141837, 3 pages.

Shklar L., et al., "InfoHarness: Use of Automatically Generated Metadata for Search and Retrieval of Heterogeneous Information," Jun. 12, 1995, Advanced Information Systems Engineering, Springer, XP047002112, pp. 217-230.

Anonymous, "Extracting Metadata from Files," XP05568, retrieved from https://developer.apple.com/library/archive/documentation/Carbon/Conceptual/MDImporters/Concepts/Importers.html#//apple_ref/doc/uid/TP40001283-CJBEJBHH, Aug. 8, 2013, 2 pages.

Anonymous, "Understanding Metadata," XP055686175, 2004, 20 pages.

Result of consultation for European Application No. 14755462.0 dated May 20, 2020, 13 pages.

Gifford, D.K., et al., "Semantic File Systems," Programming Systems Research Group MIT Laboratory for Computer Science, vol. 25, No. 1, Sep. 1, 1991, pp. 16-25.

Kaushik R., "A Spotlight on Spotlight," XP055686678, 2007, 9 pages.

Lagerspeiz E., et al., "Dessy: Towards Flexible Mobile Desktop Search," Proceedings of the DIALM-POMC International Workshop on Foundations of Mobile Computing, Aug. 16, 2007, 8 pages.

Lagerspetz E., et al., "Mobile Search and the Cloud: The Benefits of Offloading," 1st IEEE PerCom Workshop on Pervasive Communities and Service Clouds, Mar. 21, 2011, pp. 117-122.

Lindholm T., et al., "Syxaw: Data Synchronization Middleware for the Mobile web," Mobile Networks and Applications, Kluwer Academic Publishers, vol. 14, No. 5, Jan. 17, 2009, pp. 661-676.

Wehling U., et al., "Spaces—A Replication Scheme for Sharing Tagged Files in Hybrid Wireless Networks," Mobile Ubiquitous Computing, Systems, Services and Technologies, Nov. 2007, pp. 209-214.

The International Searching Authority, "Searching Report" in application No. PCT/US2014/048279, dated Oct. 22, 2014, 9 pages.

The International Bureau of WIPO, "International Preliminary Report on Patentability" in application No. PCT/US2014/048279, dated May 31, 2016, 6 pages.

Current Claims in application No. PCT/US2014/048279, dated May 2016, 6 pages.

Claims in application No. PCT/2014/048279, dated Oct. 2014, 6 pages.

Australian Patent Office, "Examination Report No. 1", in application No. 2014353513, dated Sep. 26, 2016, 2 pages.

Australian Claims in application No. 2014353513, dated Sep. 2016, 5 pages.

U.S. Appl. No. 14/089,630, filed Nov. 25, 2013, Office Action, dated May 20, 2016.

U.S. Appl. No. 14/089,630, filed Nov. 25, 2013, Interview Summary, dated Aug. 16, 2016.

U.S. Appl. No. 14/089,630, filed Nov. 25, 2013, Final Office Action, dated Nov. 22, 2016.

Abbott, U.S. Appl. No. 14/089,630, filed Nov. 25, 2013, Office Action, dated Sep. 20, 2018.

Abbott, U.S. Appl. No. 14/089,630, filed Nov. 25, 2013, Office Action, dated Jul. 12, 2017.

Abbott, U.S. Appl. No. 14/089,630, filed Nov. 25, 2013, Notice of Allowance, dated Feb. 7, 2019.

Abbott, U.S. Appl. No. 14/089,630, filed Nov. 25, 2013, Interview Summary, dated Oct. 13, 2017.

Abbott, U.S. Appl. No. 14/089,630, filed Nov. 25, 2013, Interivew Summary, dated Jan. 23, 2017.

Abbott, U.S. Appl. No. 14/089,630, filed Nov. 25, 2013, Advisory Action, dated Mar. 27, 2017.

Decision to refuse European Patent Application No. 14755462.0 dated Sep. 18, 2020, 19 pages.

* cited by examiner

GENERATING AND SHARING METADATA FOR INDEXING SYNCHRONIZED CONTENT ITEMS

CROSS REFERENCE TO RELATED APPLICATIONS, BENEFIT CLAIM

This application claims the benefit as a Continuation of application Ser. No. 14/089,630, filed Nov. 25, 2013, the entire contents of which is hereby incorporated by reference as if fully set forth herein, under 35 U.S.C. § 120. The applicant hereby rescinds any disclaimer of claim scope in the parent application or the prosecution history thereof and advises the United States Patent and Trademark Office that the claims in this application may be broader in at least some respects than any claim in the parent application.

TECHNICAL FIELD

The disclosed embodiments relate generally to sharing and synchronization of data. In particular, the disclosed embodiments are directed to generating and sharing metadata for indexing synchronized content items

BACKGROUND

Recent years have seen the development of numerous online content item management services. Services such as Dropbox provided by Dropbox, Inc. of San Francisco, Calif. allow a user to synchronize content items between the user's personal computing devices, and share content items with other users.

As used herein, the terms "content item" and "content item file" are used interchangeably to refer to a logical collection of computer data. A content item may have a name and a type. One non-limiting example of a content item is a document such as, for example, a word processing document, a presentation document, a spreadsheet document, an e-mail message, a web page, or other document. Content items can also be other types of computer data such as, for example, digital image data, digital audio data, digital video data, and other digital media data. A content item file may be stored in a computer in a variety of different computer data container formats such as, for example, in a conventional operating system file system file or in one or more addressable blocks of database. When sent over a data network, a content item file may be divided into one or more network packets that are sent over the data network, each packet having at least a portion of the content item file.

At the same time as the rise of online content item management services, the data storage capacity of mobile computing devices has increased. For example, many of today's smart phones can store tens of gigabytes of data. At the current pace of technological and manufacturing advancement, smart phones may be able to store hundreds of gigabytes of data in the near future. As a result of this increased storage capacity, users are storing more and more data on their mobile computing devices. While the data storage capability of mobile computing device is increasing and will likely continue to increase for the foreseeable future, improvements in battery life and improvements in the time needed between charges have not kept pace.

As users store more and more data on their mobile computing devices, finding relevant or particular information among the data has become more difficult. Desktop search applications exist that allow users to keyword search for content items stored on their personal computing devices based on keywords extracted from the names and content of the content items. Such applications may create a keyword index of the content items for more efficient searching.

Unfortunately, current desktop search applications inadequately address the needs of users of online content item management services. For example, users of such services often synchronize content items between multiple personal computing devices. However, current desktop search applications typically provide indexing and searching capabilities on only one personal computing device. As another deficiency, current desktop search applications were designed on the assumption that the computing devices on which they execute operate on fixed power. As a result of this assumption, if executed on a mobile computing device that operates on battery power, they may inefficiently computer resources (e.g., CPU resources) crawling and indexing content item files.

SUMMARY

Embodiments of the invention generate and share metadata for indexing synchronized content items. A server generates metadata for indexing synchronized content items and manages sharing of the metadata with client devices in accordance with user preferences that may be embodied in metadata generation and sharing management rules. For example, a content item stored at the server has been designated to be synchronized across at least a first client and a second client. The server generates metadata for indexing the content item and sends the metadata to at least the first client and the second client.

Other embodiments include a system and a non-transitory computer-readable storage medium for indexing content items using synchronized content item metadata according to the techniques described above.

The features and advantages described in this specification are not all inclusive and, in particular, many additional features and advantages will be apparent to one of ordinary skill in the art in view of the drawings, specification, and claims.

The figures depict various embodiments of the present invention for purposes of illustration only. One skilled in the art will readily recognize from the following description that other alternative embodiments of the structures and methods illustrated herein may be employed without departing from the principles of the invention described herein.

DETAILED DESCRIPTION

System Overview

Embodiments of the invention generate metadata for indexing synchronized content items and share the generated metadata with client devices. The shared metadata may be used at the client devices for indexing the synchronized content items. The metadata may be generated by a server alleviating the client devices from having to do so, thereby conserving processor cycles at the client devices and conserving battery power at the client devices, if the client devices are battery powered. Metadata generation and sharing management rules are applied to determine which content items indexing metadata should be generated for and to determine which client devices generated metadata should be shared with.

Figure 1:
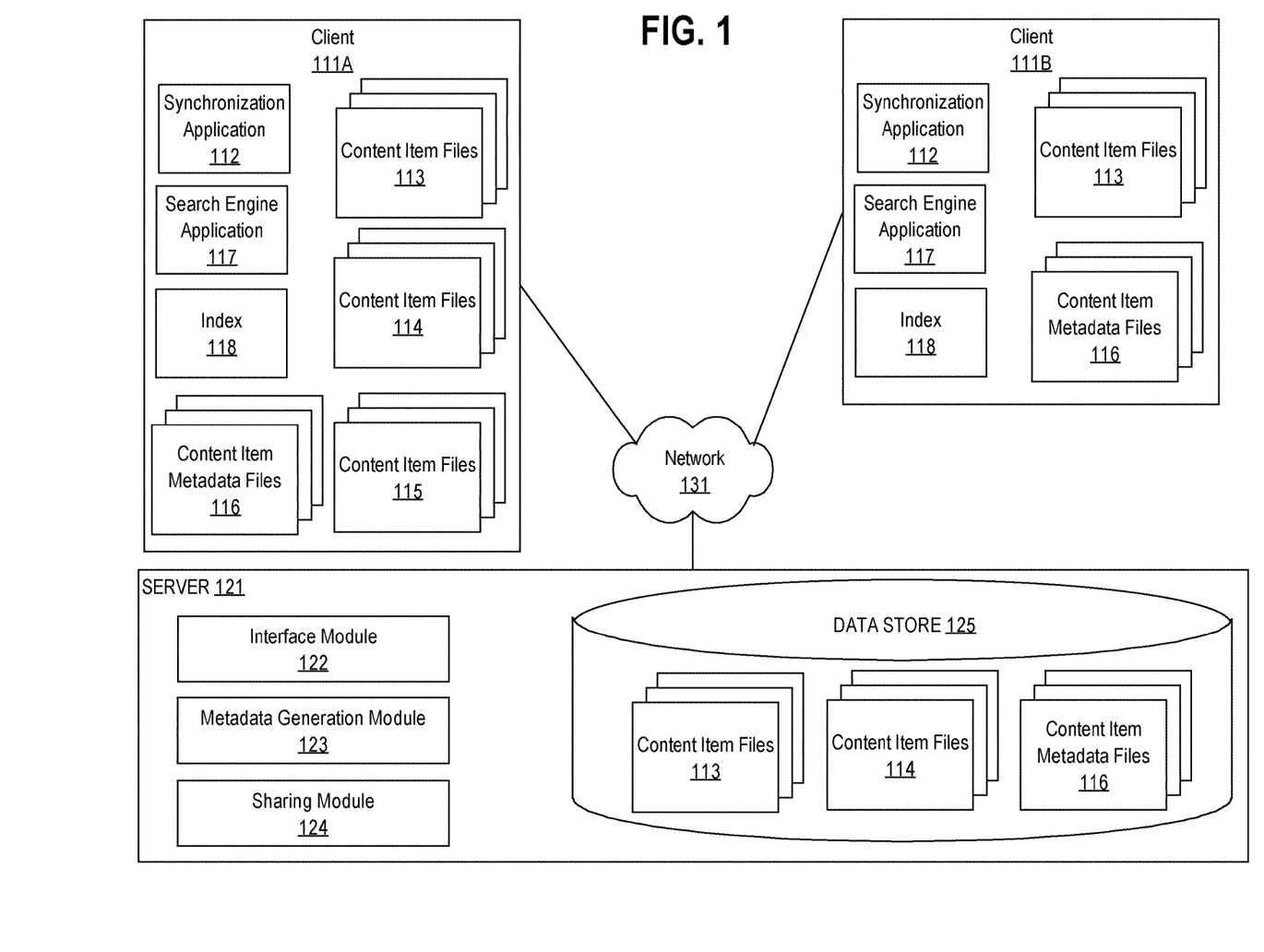
FIG. 1 is a block diagram of a computing environment in which generating and sharing metadata for indexing synchronized content items can be performed, in accordance with an embodiment of the invention.

FIG. 1 illustrates a computing environment in which generating and sharing metadata for indexing synchronized content items can be performed, in accordance with an embodiment of the invention. The computer environment includes a plurality of clients 111A, 111B (collectively 111) and a server 121 connected via a network 131.

Network 131 represents the communication pathways between clients 111 and the server 121. In one embodiment, the network 131 uses standard Internet communications technologies and/or protocols. Thus, the network 131 can include links using technologies such as Ethernet, IEEE 802.11, IEEE 806.16, WiMAX, 3GPP LTE, integrated services digital network (ISDN), asynchronous transfer mode (ATM), etc. Similarly, the networking protocols used on the network 131 can include the transmission control protocol/Internet protocol (TCP/IP), the hypertext transport protocol (HTTP), the simple mail transfer protocol (SMTP), the file transfer protocol (FTP), etc. The data and files 113, 114, and 116 exchanged over the network 131 can be represented using any file format, including without limitation a wide variety of text document formats, audio file formats, and image file formats. In addition, all or some links can be encrypted using conventional encryption technologies such as the secure sockets layer (SSL), Secure HTTP (HTTPS) and/or virtual private networks (VPNs). In another embodiment, the entities can use custom and/or dedicated data communications technologies instead of, or in addition to, the ones described above.

Clients 111 add content item files to server 121 through a manual upload process, or by synchronization with a local file system. If by synchronization, each client 111 executes a synchronization application 112 through which content item files stored at that client are specified for synchronization with the server 121.

In the example shown in FIG. 1, content item files 113 and 114 are specified for synchronization with the server 121, whereas content item files 115 are not. Thus, the synchronization application 112 then provides only the specified content item files 113 and 114 to the server 121.

The synchronized content items are typically provided only to other clients 111 with which a user has decided to share content item files. In this example, content items files 113 of client 111A are specified to be synchronized with client 111B. Thus, the specified content item files 113 are then provided to client 111B, either by "push" synchronization in which the server 121 provides the content item files 113 to the client 111B, or by "pull" synchronization in which the client 111B requests the content item files 113 from the server 121.

The synchronization applications 112 and the server 121 also ensure that changes to the synchronized content item files 113 are propagated across all associated clients 111. Concurrent changes at multiple clients 111 to the same synchronized content item file 113 can result in a conflict that requires resolution that determines which of the concurrent changes is the preferred one that should be adopted at all associated clients 111 and the server 121. Particular conflict resolution techniques are beyond the scope of this disclosure. However, in general, such resolution may be manual or automatic, according to the requirements of the particular implementation at hand.

Copies of the synchronized content item files 113 and 114 may be stored at both the server 121 and clients 111 among which the content item files 113 and 114 are shared. Alternatively, clients 111 may provide a user interface (e.g., a web browser-based and/or a file browser-based user interface) for manipulating some or all of the synchronized content item files 113 and 114 shared with it as stored on the server 121 without keeping a local copy.

FIG. 1 illustrates only two clients 111A and 111B for purposes of providing clear examples. Examples of client devices include a desktop computer, a laptop computer, a tablet computing device, and a handheld computing device such as a personal digital assistant or a smart phone (e.g., an IPHONE, BLACKBERRY, SYMBIAN, or ANDROID-based smart phone). The clients 111A and 111B may be commonly owned by a single user. For example, one device 111A can be a user's desktop computer and the other device 111B can be the same user's smart phone. Or the client devices 111A and 11B may be owned by different users.

When operating, the server 121 may be in communication with many clients. In practice a single user may own several clients between which the user wants to share and synchronize content items, and/or the user may want to share and synchronize content items with clients owned by other users.

Each client may store one or multiple content item files on server 121 in different data formats. When represented to the user, the content item files may be arranged in content item folders (i.e., containers for content item files); and content item folders themselves may be arranged in other content item folders, as determined by the user; however the underlying storage architecture may be considerably different, and implemented to maximize storage efficiency, and without necessarily mirroring a content item file-folder hierarchy.

In some implementations, content item folders may be shared between two or more users. Typically, a shared content item folder originates and is controlled by one user, but it provides access to content item files in the shared content item folder to each of the users among whom the content item folder is shared. In some embodiments, any of the users among whom the content item folder is shared can make changes to content item files in it to create modified versions of the content item files in it. The modified versions of the content item files are then synchronized across the clients belonging to the users among whom the content item folder is shared.

The server 121 generates content item metadata files, stores content item files and content item metadata files, manages the synchronization of content item files across client devices, and shares content item metadata files in accordance with metadata generation and sharing management rules. The server 121 and its components may be implemented using any appropriate hardware for performing file serving and storage—solely for clarity of illustration and description, FIG. 1 illustrates only a single server, and one instance of relevant file stores and modules. However, the functionality provided by server 121 described herein may be implemented on multiple servers and by multiple instances of relevant file stores and modules. Additionally, many components required for operation of a server, known to those of skill in the art but not germane to this description—for example, network cards, CPUs, memory, and the like—are omitted for clarity.

As illustrated in FIG. 1, the server 121 includes an interface module 121, a metadata generation module 123, a sharing module 124, and a data store 125.

The interface module 122 interfaces with clients 111 to facilitate content item file and content item metadata file storage, access, sharing, and synchronization between the server 121 and clients 111, and is one means of implementing this functionality. The interface module 122 receives content item files and content item metadata files from and sends content item files and content item metadata files to clients 111 consistent with the user's preferences for sharing content item files and content item metadata files. The interface module 122 also manages communications with clients 111 regarding the user's instructions with respect to indexing metadata sharing management rules, which will be described in greater detail below. The interface module 122 may act as the counterpart on the server 121 to a client-side file-browser style interface that allows a user to manipulate content item files stored on the server 121.

In some embodiments, software executing on a client 111 integrates the network-stored content item files with the client's local file system to enable a user to manipulate the network-stored content item files through the same user interface (UI) as is used to manipulate m files on the local file system, e.g., via a file explorer. As an alternative to the client-side file-browser interface, the interface module 122 of the server 121 may provide a web interface to a user for manipulating the content item files stored on the server 121.

The data store 125 stores content item files submitted to it by clients 111. In the example illustrated in FIG. 1, client 111A has stored content item files 113 and 114 in the data store 125. Thus, the data store 125 of the server 121 maintains a copy of the files 113 and 114 that may also be present in local storage on the client 111.

The data store 125 also stores content item metadata files that server 121 generates. In the example of FIG. 1, data store 125 stores content item metadata files 116 generated by server 121.

The metadata generation module 123 of the server 121 receives, stores, and applies rules to determine which content items indexing metadata should be generated for according to user preferences, and is one means for implementing this functionality.

The sharing module 124 of the server 121 manages the user's preferences with regard to content item files to be shared and the users/devices with whom they should be shared. In various embodiments, the user can select a combination of a single content item file, multiple content item files within a content item folder, multiple content item folders, or multiple content item files across multiple content item folders as a content item file set to be shared and synced. The content item file sharing also may be accomplished by generating a unique link that unambiguously identifies the content item file set to which it corresponds, as is described in U.S. patent application Ser. No. 13/217,944 filed Aug. 25, 2011, entitled "File Sharing Via Link Generation," which is incorporated herein by reference in its entirety.

The sharing module 124 of the server 121 also manages the user's preferences with regard to content item metadata files to be shared and the users/devices with whom they should be shared. In various embodiments, as described in greater detail below, the sharing module 124 applies metadata sharing management rules to determine which users/devices indexing metadata generated by the metadata generation module 123 should be shared with.

Each client 111 may be configured with a search engine application 117 for keyword searching for content items. The search engine application 117 may maintain an index 118 for quickly finding content items of interest. The search engine application 117 may record properties and keywords of content item files in index 118 based on content item metadata generated for the content item files. The content item files that match the stored keywords and properties can then quickly be found by the search engine application 117 using index 118.

In some embodiments, index 118 is an inverted file index in which a list of content item file identifiers is stored for each keyword. When a keyword appears in a search query submitted to search engine application 117, the list of content item files associated with the keyword may be added to the set of search results or intersected with them, depending on whether the search query was a Boolean OR or AND.

In some embodiments, to limit the size of index 118, keywords in the index 118 are word fragments of a certain length N (also referred to as N-grams). For example, N may be two or three. Since the number of possible 2-grams and 3-grams is relatively small, using N-grams instead of full keywords limits the size of index 118.

In some embodiments, keywords in the index 118 are a stemmed form of a word and query terms are stemmed by the search engine application 117 before consulting the index 118 with the stemmed form of the query terms. In some embodiments, the search engine application 117 stems words obtained from indexing metadata before inserting the stemmed form of the words in the index 118. In some embodiments, words obtained from indexing metadata are already in stemmed form. The stemming process involves reducing a word to a form shared by different inflections or cases of the word. For example, "stemming", "stemmer", and "stem" could all be reduced to "stem". Stemming may increase the recall of the search engine application 117, since content item files associated with different forms of the same word are found with the same query.

In some embodiments, keywords in the index 118 are a lemmatized form of a word and query terms are lemmatized by the search engine application 117 before consulting the index 118 with the lemmatized form of the query terms. In some embodiments, the search engine application 117 lemmatizes words obtained from indexing metadata before inserting the lemmatized form of the words in the index 118. In some embodiments, words obtained from indexing metadata are already lemmatized. The lemmatization process reduces a word to its lemma, or basic grammatical form. Lemmatization may also involve associate dissimilar word forms with the same lemma. Lemmatization may be language specific. For example, the English words "better" and "best" may be reduced to "good" when using an English language lemmatizer.

In some embodiments, search engine application 117 employs a ranking function to order content item file search results that are an answer to a query. The ranking function may be used by the search engine application 117, for example, to present the search results in decreasing order of relevance with respect to the search query. The ranking function may be any one suitable for the requirements of the particular implementation at hand. Some examples of possible ranking functions that may be used include a term frequency—inverse document frequency (TD/IDF) measure or a measure derived therefrom such as, for example, Okapi BM25 or an extension thereof.

The search engine application 117 may provide a search interface or other point of interaction between a user and the search engine application 117. Via the search interface, a user may submit a search request to the search engine application 117. Via the search interface, the user may further receive information concerning one or more data structures, or "search results", that the search engine has identified as matching the search request. The search results may identify content item files matching the search request. The search interface may be web-based, in which search engine application 117 provides a web browser with a web page comprising controls via which a user may input search requests. Once the search request has been entered and submitted, the user's web browser typically sends the request to the search engine application 117 using a request in a Hyper-Text Transfer Protocol (HTTP) or other suitable web-based protocol. The search engine application 117 then consults the index 118 with the search request to determine search results and returns the search results to the user's browser.

Clients may store content item metadata shared with them by server 121. In the example of FIG. 1, server 121 has generated content item metadata 116 and shared it with both client 111A and client 111B. Content item metadata stored at clients 111 may be incorporated into the index 118 at the client. The incorporation may be performed by the search application 112 and/or the search engine application 117 at the client.

Content item metadata may contain data pertaining to content item files for incorporation into index 118. For example, content item metadata may be contain keywords pertaining to content item files and identifiers of content items to which the keywords pertain. The keywords may be stemmed and/or lemmatized forms of words. An identifier associated with a keyword in content item metadata may be any data that identifies a content item or content items to which the keywords pertains. For example, an identifier may be cryptographically hashed token, an alpha-numeric character sequence, an absolute or relative file system path, a Uniform Resource Locator (URL) or a portion thereof, or other data that identifies a content item or content items to server 121 and clients 111.

In some embodiments, content item metadata files stored at clients 111 are stored alongside content item files stored at clients 111. For example, content item metadata files may be stored in operating system file system folders of the client in which content item files are also stored.

Metadata generation module 123 and sharing module 124 apply metadata generation and sharing management rules to determine which content items indexing metadata should be generated for and to determine which devices to share generated content item metadata with, and are one means for implementing this functionality. User preferences for determining which content items indexing metadata should be generated for and for determining which devices to share generated content item metadata with may be established in various categories and communicated from a client 111 to the metadata generation module 123 and the sharing module 124 of server 121 via the interface module 122. Examples of categories of rules that may be established are as follows. It is noted that one or more types of rules can be established within each category, and combinations of rules within different categories are also possible.

Metadata Generation—Device Rules

Rules in this category determine which content items to generate indexing metadata for based on the device at which the initial or a modified version of a content item was created. An exemplary rule within the device category specifies an individual device. For example, a device rule may specify that content item metadata should be generated for a content item created or modified at a specified device. After server 121 receives a content item or modification thereto from the specified device, metadata generation module 123 applies the device rule and generates content item metadata for the content item. Another exemplary rule within the device category specifies a group of devices. For example, a device rule may specify that content item metadata should be generated for a content item created or modified at any device belonging to a specified user. After server 121 receives a content item or modification thereto from any of the user's devices, metadata generation module 123 applies the device rule and generates content item metadata for the content item.

Metadata Generation—User Rules

Rules in this category determine which content items to generate indexing metadata for based on the user that created an initial or a modified version of a content item. An exemplary rule within the user category specifies an individual user. For example, a user rule may specify that content item metadata should be generated for a content item created or modified by a specified user. After server 121 receives a content item or modification thereto created by the specified user, metadata generation module 123 applies the user rule and generates content item metadata for the content item. Another exemplary rule within the user category specifies a group of users. For example, a user rule may specify that content item metadata should be generated for a content item created or modified by any user belonging to a specified group of users (e.g., a named team of users). After server 121 receives a content item or modification thereto created by a user in the specified group, metadata generation module 123 applies the user rule and generates content item metadata for the content item.

Metadata Generation—Type Rules

Rules in this category determine which content items to generate indexing metadata for based on the type of a content item. An exemplary rule within the type category specifies a content item type. For example, a type rule may specify that content item metadata should be generated for a content item having a type of MICROSOFT WORD (e.g., .doc, .docx). When server 121 receives a content item, or a modification thereto, having the type MICROSOFT WORD, metadata generation module 123 applies the type rule and generates content item metadata for the content item. Another exemplary rule within the type category specifies a content item type category that defines a class of content items by a generic type. For example, a type rule may specify that content item metadata should be generated for a content item, or modification thereof, that is categorized as a document type content item (e.g., a MICROSOFT WORD, an ADOBE PDF (.pdf), a web page (e.g., .htm, .html), a text, a rich-text, or other document). After server 121 receives a content item, or modification thereof, with a specific type in the specified type category, metadata generation module 123 applies the type rule and generates content item metadata for the content item.

Metadata Generation—Name Rules

Rules in this category determine which content items to generate indexing metadata for based on the name of a content item. An exemplary rule within the name category specifies a name of a content item or a portion of content item name. For example, a name rule may specify that content item metadata should be generated for a content item matching, or having a sub-character string that matches, the string "contract". When server 121 receives a content item having the name "contact" or having a sub-character string that matches "contract", metadata generation module 123 applies the name rule and generates content item metadata for the content item. Another exemplary rule within the name category specifies a regular expression for pattern matching against content item name. For example, a name rule may specify that content item metadata should be generated for a content item with a name that matches the regular expression "*.htm*". After server 121 receives the content item having a type within the specified category, metadata generation module 123 applies the type rule and generates content item metadata for the content item.

Metadata Generation—Sharing Rules

Rules in this category determine which content items to generate indexing metadata for based on if and, optionally, how a content item is shared with a user. An exemplary rule within the sharing rules category specifies a Boolean value. For example, a sharing rule may specify TRUE to indicate that if a content item is shared by one user with another user, then content item metadata should be generated for the content item. A FALSE value may specify that if a content item that is not shared with another user, then content item should not be generated for the content item. Alternatively, a FALSE value may be neutral in the sense that other rules, perhaps in other categories, govern whether metadata is generated for the content item. Another exemplary rule within the sharing rule category specifies a manner of sharing a content item. For example, a sharing rule may specify a content item metadata should be generated for a content item that is shared as part of a shared folder or a part of a collection of shared content items. After server 121 receives a content item that is part of a shared folder or a shared group of content items, metadata generation module 123 applies the sharing rule and generates content item metadata for the content item.

Metadata Sharing Rules

Rules in this category determine which clients generated content item metadata is shared with by the server. An exemplary rule within the metadata sharing rules category specifies that all content item metadata generated for a content item is to be shared by the server with all devices with which the content item is synchronized with. For example, content item metadata generated by server 121 for content item files 113 would be shared with both clients 111A and 111B, but content item metadata generated for content item files 114 would be shared only with client 111A and not client 111B. After generating content item metadata for content items 113, server 121 shares the content item metadata with clients 111A and 111B and after generating content item metadata for content items 114, server 121 shares the generated metadata with only client 111A but not client 111B.

Another exemplary rule within the metadata sharing rules category specifies individual devices or groups of devices with which content item metadata generated for specified content items is to be shared with. For example, a metadata sharing rule may specify that content item metadata generated for content item files 114 is to be shared with client 111B even though content item files 114 are not synchronized with client 111B. In this way, assuming the generated metadata is incorporated into the index 118 at client 111B, a user of client 111B can search for content item files 114 using search engine application 117 even though content item files 114 are not synchronized with client 111B. After generating content item metadata for content item files 114, server 121 shares the generated metadata with client 111B. In this way, a user of client 111B can search for content item files 114 using search engine application 117 even though content item files 114 are not synchronized with client 111B.

Another exemplary rule within the metadata sharing rules category specifies individual users or groups of users with which content item metadata generated for specified content items is to be shared with. For example, a metadata sharing rule may specify that content item metadata generated for content item files 114 is to be shared with a specified user. After generating content item metadata for content item files 114, server 121 shares the generated metadata with all clients 111 known to server 121 associated with the specified user.

The rules applied by server 121 to determine which content items to generate indexing metadata for and to determine which clients to share the generated metadata with may be established as a default across all users, clients, and content item files, or may be established as a result of user preferences set at various levels of granularity. For example, a user may set some rules applicable to all content item files and client associated with the user, other rules applicable only to clients of a particular client type or types (e.g., only to mobile clients such as smart phones), and still other rules applicable to only one or more particular content item files (e.g., only to content item files shared by the user with other users). Thus, a combination of rules may be applicable to any given content item file, user, or client. In addition, the rules may be changed as a user's preferences change. Thus, in various implementations, the metadata generation module 123 and the sharing module 124 of the server 121 enables users to have flexibility in establishing indexing metadata generation and sharing management rules to apply to a wide variety of situations.

Figure 2:
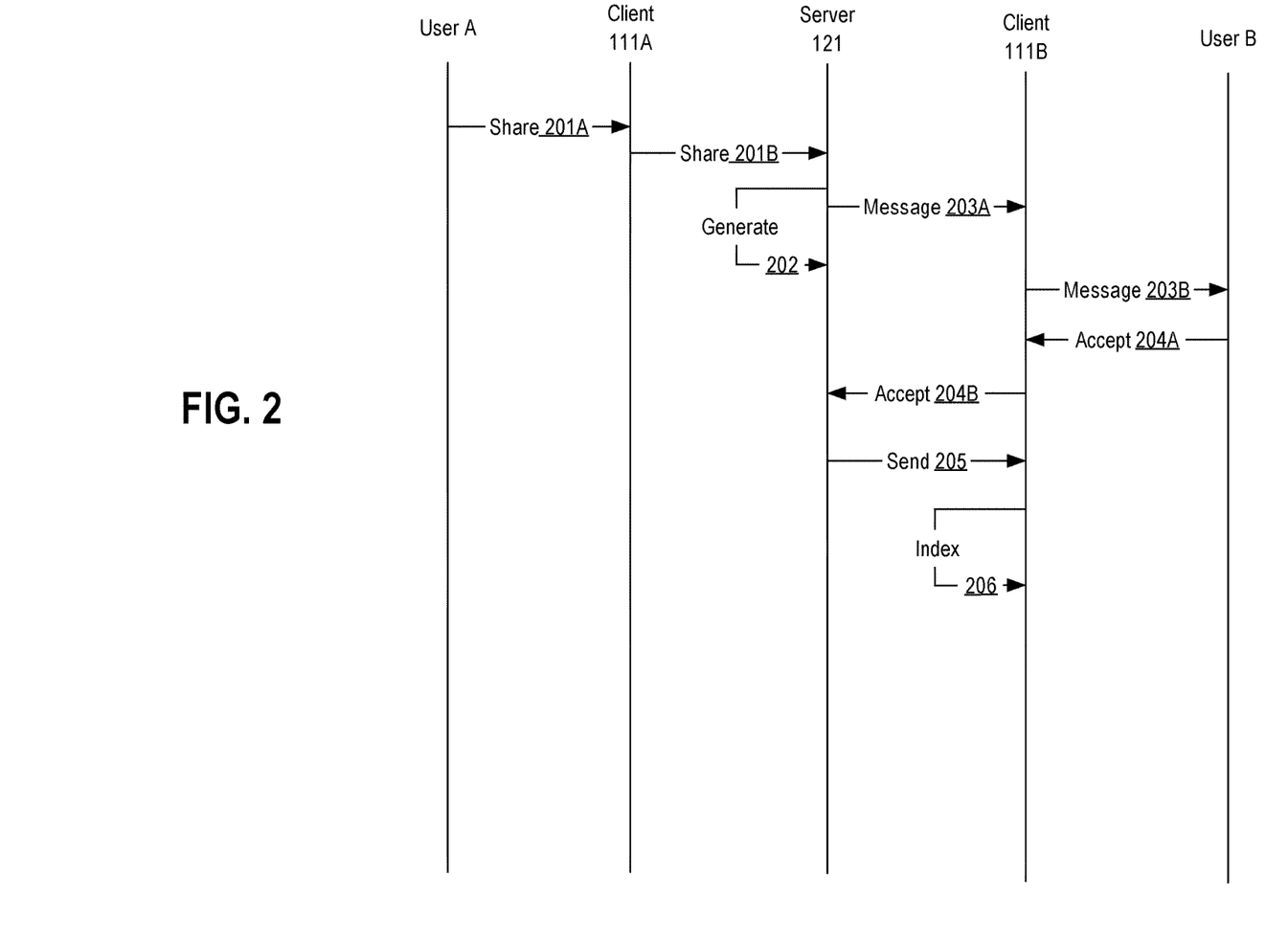
FIG. 2 is a flow diagram illustrating a method for generating and sharing indexing metadata and referencing components in the computing environment of FIG. 1, in accordance with an embodiment of the invention.

FIG. 2 is a flow diagram illustrating a method for generating and sharing indexing metadata and referencing components in the computing environment of FIG. 1, in accordance with an embodiment of the invention. In the scenario illustrated in FIG. 2, in step 201, a first user (User A) of client 111A has requested server 121 to share content item files 113 with another user (User B). For example, User A may issue the request to server 121 through an application (e.g., a web browser application) executing on client 111A. At the time the share request is received by server 121, content item files 113 may be stored at client 111A and at server 121 but need not be stored at client 111B. Step 201A represents the step of User A interacting with the application executing on client 111A to request the server 121 to share content item files 113 with User B. For example, step 201A may include User A activating a "Share" button or other user interface element. Step 201B represents the step of client 111A sending a network request (e.g., a HTTP or HTTPS request) to server 121 to share content item files 113 with User B.

In step 202, server 121 applies metadata generation management rules and determines that indexing metadata should be generated for content item files 113. For example, server 131 may apply a metadata generation sharing category rule that specifies that indexing metadata is to be generated for content item files shared from one user to another. To generate the indexing metadata for content item files 113, server 121 may parse or otherwise processes content item files 113 extracting relevant keywords. Server 121 may optionally stem and/or lemmatize extracted keywords. Server 121 may obtain content item metadata for content item files 113 based on the names, modification dates, and creation dates of the content item files 113. In addition to or instead of the content of the content item files 113, server 121 can generate content item metadata for content item files 113 based on context data available to server 121. For example, context data available to server 121 for a digital photo type content item file 113 may include data reflecting the geographic location of where the photo was captured, Bluetooth devices nearby the device that captured the photo when the photo was captured, and calendar events corresponding to when the photo was captured.

In step 203, server 121 messages User B to inform that User B has requested to share content item files 113 with User B. For example, server 121 may send an e-mail message to User B at an e-mail address of record available to server 121. Step 203A represent the step of server 121 sending a message to User B which happens to be received at client 111B. For example, step 202A may include server 121 sending an e-mail message to User B, a text message to User B, or a push notification to User B. Step 203B represents the step of User B receiving the message sent by the server 121. For example, step 202B may include presenting the message in an application executing on client 111B.

In step 204, User B accepts the request to share from User A and communicates acceptance to server 121. For example, User B may issue a request to accept to server 121 through an application (e.g., a web browser application) executing on client 111B. Step 204A represents the step of User B interacting with the application executing on client 111B to communicate acceptance to server 121. For example, step 204A may include User B activating an "Accept" button or another user interface element. Step 204B represents the step of client 111B sending a network request (e.g., a HTTP or HTTPS request) to server 121 to indicate that User B has accepted the request to share content items files 113 from User A.

In step 205, server 121 sends content item files 113 and the content item metadata generated for content item files 113 to client 111B. For example, content item files 113 and the generated content item metadata may be sent to client 111B during a synchronization exchange between server 121 and the synchronization application 112 executing on the client 111B.

In Step 206, search engine application 117 and/or synchronization application 112 indexes content item files 113 using the content item metadata received in step 205. This indexing includes storing data, or data derived therefrom, in the index 118 at client 111B.

Once indexed, User B may use the search engine application 117 to perform keyword searching on content item files 113 as indexed in index 118 at client 111B.

Some of the method steps shown in FIG. 2 and described above may be performed in a different order that as shown and described. For example, step 202 may end before step 203A begins or step 202 may start after step 204B completes. Further, some of the method steps may be performed concurrently with one another. For example, step 206 may be performed while content item metadata is being received in step 205.

Optionally, at step 205, some or all of the content item files 113 shared with User B are not sent to client 111B. However, the generated content item metadata for indexing all content item files 113 is sent to client 111B at step 205. In this way, content item files 113 can be sent to client 111B as needed or as requested by User B. For example, after step 206, User B may keyword search for content item files 113 of interest using search engine application 117. The search results generated by search engine application in response to the search request may summarize relevant content item files 113 based on the content item metadata stored in index 118. User B may then select content item files 113 of interest from the search results which are then downloaded to client 111B from server 121.

Example Implementing Mechanism

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 3:
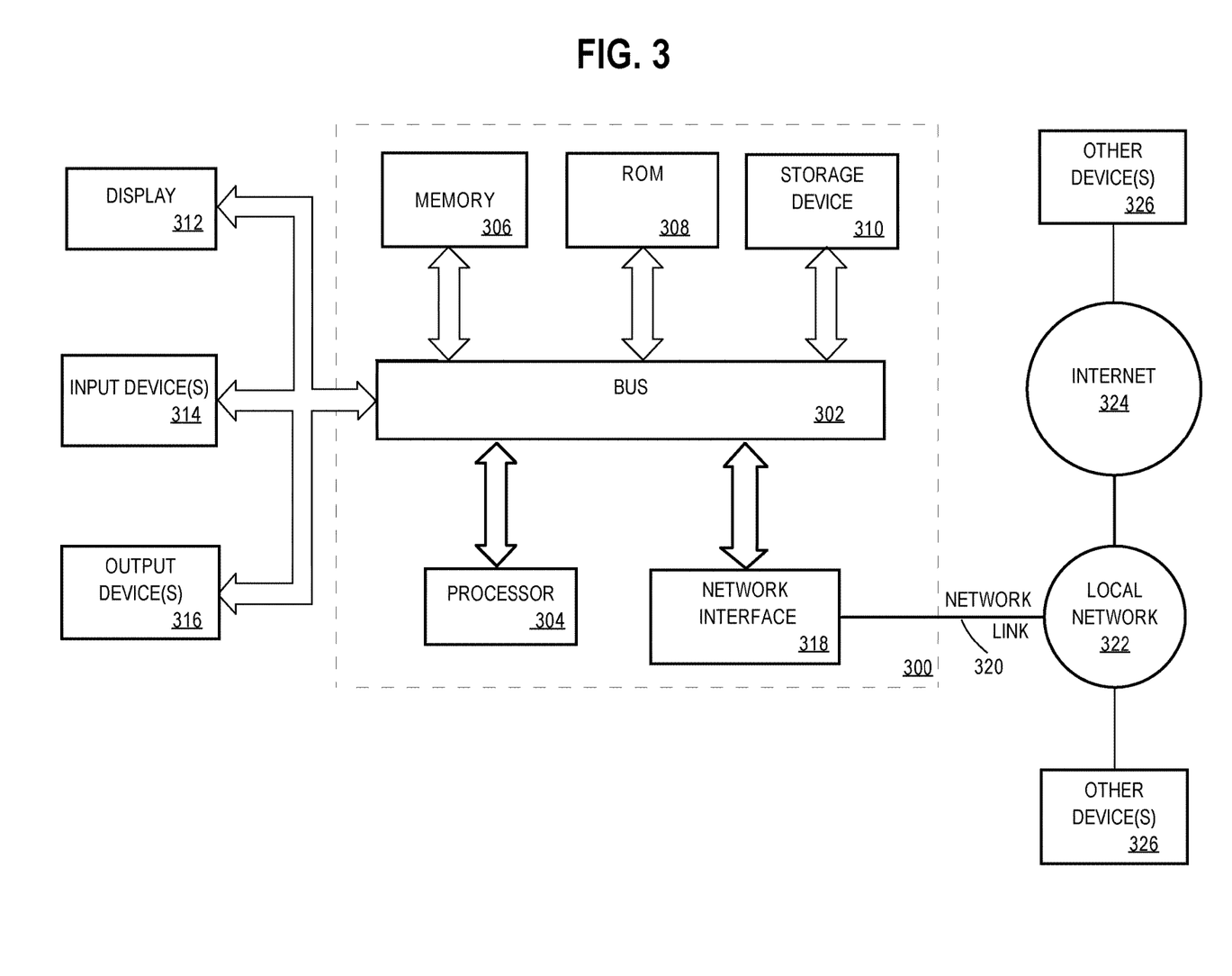
FIG. 3 is a block diagram illustrating a computer system on which embodiments of the present invention may be implemented.

For example, FIG. 3 is a block diagram that illustrates a computer system 300 upon which an embodiment of the invention may be implemented. Computer system 300 includes a bus 302 or other communication mechanism for communicating information, and a hardware processor 304 coupled with bus 302 for processing information. Hardware processor 304 may be, for example, a general-purpose microprocessor.

Computer system 300 also includes a main memory 306, such as a random-access memory (RAM) or other dynamic storage device, coupled to bus 302 for storing information and instructions to be executed by processor 304. Main memory 306 also may be used for storing temporary variables or other intermediate information during execution of instructions to be executed by processor 304. Such instructions, when stored in non-transitory storage media accessible to processor 304, render computer system 300 into a special-purpose machine that is customized to perform the operations specified in the instructions.

Computer system 300 further includes a read only memory (ROM) 308 or other static storage device coupled to bus 302 for storing static information and instructions for processor 304. A storage device 310, such as a magnetic disk, optical disk, or solid-state drive is provided and coupled to bus 302 for storing information and instructions.

Computer system 300 may be coupled via bus 302 to a display 312, such as a cathode ray tube (CRT), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

Computer system 300 may implement the techniques described herein using customized hard-wired logic, one or more ASICs or FPGAs, firmware and/or program logic which in combination with the computer system causes or programs computer system 300 to be a special-purpose machine. According to one embodiment, the techniques herein are performed by computer system 300 in response to processor 304 executing one or more sequences of one or more instructions contained in main memory 306. Such instructions may be read into main memory 306 from another storage medium, such as storage device 310. Execution of the sequences of instructions contained in main memory 306 causes processor 304 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 310. Volatile media includes dynamic memory, such as main memory 306. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 302. Transmission media can also take the form of acoustic or light waves, such as those generated during radio-wave and infra-red data communications.

Various forms of media may be involved in carrying one or more sequences of one or more instructions to processor 304 for execution. For example, the instructions may initially be carried on a magnetic disk or solid-state drive of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated service digital network (ISDN) card, cable modem, satellite modem, or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are example forms of transmission media.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318.

The received code may be executed by processor 304 as it is received, and/or stored in storage device 310, or other non-volatile storage for later execution.

Extensions and Alternatives

The disclosure herein has been described in particular detail with respect certain embodiments. Those of skill in the art will appreciate that other embodiments may be practiced. First, the particular naming of the components and variables, capitalization of terms, the attributes, data structures, or any other programming or structural aspect is not mandatory or significant, and the mechanisms that implement the invention or its features may have different names, formats, or protocols. Also, the particular division of functionality between the various system components described herein is merely exemplary, and not mandatory; functions performed by a single system component may instead be performed by multiple components, and functions performed by multiple components may instead be performed by a single component.

Some portions of the above description describe the systems and methods for generating and sharing indexing metadata according to a server-based architecture. In other embodiments, the generating and sharing indexing functionality may be client-based instead, with the logic for generating and sharing indexing metadata residing on a client rather than on the server.

Moreover, some portions of the above description describe a server storing content item files and content item metadata files. It is noted that storage of an entire file is unnecessary in some embodiments of the invention. For example, a content item file or a content item metadata file may be stored by breaking the file into data blocks, storing the data blocks in various locations, and storing the list of locations from which the data blocks can be accessed in order to reconstruct the file. When a content item file or a content item metadata file is modified relative to an initial or previous version, it is possible to only store the changed data blocks and a new list of locations from which the modified file can be reconstructed, rather than storing the unchanged data blocks again.

Some portions of above description present features in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "determining" or the like, refer to the action and processes of a computer system, or similar electronic computing device, that manipulates and transforms data represented as physical (electronic) quantities within the computer system memories or registers or other such information storage, transmission or display devices.

Certain aspects of the embodiments disclosed herein include process steps and instructions described herein in the form of an algorithm. It should be noted that the process steps and instructions could be embodied in software, firmware or hardware, and when embodied in software, could be downloaded to reside on and be operated from different platforms used by real time network operating systems.

The algorithms and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the art, along with equivalent variations. In addition, the present invention is not described with reference to any particular programming language. It is appreciated that a variety of programming languages may be used to implement the teachings of the present invention as described herein, and any references to specific languages are provided for enablement and best mode of the present invention.

The embodiments disclosed herein are well suited to a wide variety of computer network systems over numerous topologies. Within this field, the configuration and management of large networks comprise storage devices and computers that are communicatively coupled to dissimilar computers and storage devices over a network, such as the Internet.

Finally, it should be noted that the language used in the specification has been principally selected for readability and instructional purposes, and may not have been selected to delineate or circumscribe the inventive subject matter. Accordingly, the disclosure herein is intended to be illustrative, but not limiting, of the scope of the invention, which is set forth in the following claims.

The invention claimed is:

1. A computer-implemented method for generating and sharing metadata for indexing a synchronized content item, the method, performed at a server system comprising one or more processors, the computer-implemented method comprising:
the server system storing a content item that is synchronized between the server system and a first battery-operated client device, the content item hosted with a content management service that operates the server system, the first battery-operated client device associated with a first user account held with the content management service;
based on receiving via data network a modification to the content item from the first battery-operated client device, the server system automatically generating a keyword metadata for indexing the content item, as modified, according to a metadata generation rule and based on parsing the content item, as modified;
according to a metadata sharing rule, the server system automatically sending via a data network the keyword metadata to a second client device that is not the first battery-operated client device, the second client device associated with a second user account held with the content management service that is not the first user account, the server system automatically sending the keyword metadata to the second client device responsive to receiving a request from the second client device of an acceptance of a request to share the content item with the second user account, the request to share the content item associated with the first user account; and
wherein the server system automatically sending the keyword metadata to the second client device causes the content item, as modified, to be indexed in an inverted file index at the second client device by the keyword metadata.

2. The computer-implemented method of claim 1, further comprising:
the server system automatically generating the keyword metadata for indexing the content item, as modified, according to the metadata generation rule, based on the metadata generation rule identifying the first battery-operated client device.

3. The computer-implemented method of claim 1, further comprising:
the server system automatically generating the keyword metadata for indexing the content item, as modified, according to the metadata generation rule, based on the metadata generation rule identifying a particular user that holds a user account held with the content management service; and
wherein the user account is associated with the first battery-operated client device.

4. The computer-implemented method of claim 1, further comprising:
the server system automatically generating the keyword metadata for indexing the content item, as modified, according to the metadata generation rule, based on the metadata generation rule identifying a particular content item type; and
wherein a type of the content item is the particular content item type.

5. The computer-implemented method of claim 1, further comprising:
the server system automatically generating the keyword metadata for indexing the content item, as modified, according to the metadata generation rule, based on a name of the content item satisfying the metadata generation rule.

6. The computer-implemented method of claim 1, further comprising:
the server system automatically generating the keyword metadata for indexing the content item, as modified, according to the metadata generation rule, based on the metadata generation rule identifying a particular user that holds a user account held with the content management service and based on the metadata generation rule identifying a particular content item type;
wherein the user account is associated with the first battery-operated client device; and
wherein a type of the content item is the particular content item type.

7. The computer-implemented method of claim 1, wherein the first battery-operated client device is associated with a particular user account held with the content management service; and wherein the second client device is associated with the particular user account.

8. One or more non-transitory computer-readable media comprising:
- one or more programs for generating and sharing metadata for indexing a synchronized content item, the one or more programs including instructions which, when executed by a server system comprising one or more processors, cause:
- the server system storing a content item that is synchronized between the server system and a first battery-operated client device, the content item hosted with a content management service that operates the server system, the first battery-operated client device associated with a first user account held with the content management service;
- based on receiving via a data network a modification to the content item from the first battery-operated client device, the server system automatically generating a keyword metadata for indexing the content item, as modified, according to a metadata generation rule and based on parsing the content item, as modified;
- according to a metadata sharing rule, the server system automatically sending via a data network the keyword metadata to a second client device that is not the first battery-operated client device, the second client device associated with a second user account held with the content management service that is not the first user account, the server system automatically sending the keyword metadata to the second client device responsive to receiving a request from the second client device of an acceptance of a request to share the content item with the second user account, the request to share the content item associated with the first user account; and
- wherein the server system automatically sending the keyword metadata to the second client device causes the content item, as modified, to be indexed in an inverted file index at the second client device by the keyword metadata.

9. The one or more non-transitory computer-readable media of claim 8, further comprising:
- one or more programs having instructions which, when executed by the server system, cause:
- the server system automatically sending the keyword metadata to the second client device for indexing the content item, as modified, at the second client device, based on the server system automatically generating the keyword metadata for indexing the content item.

10. The one or more non-transitory computer-readable media of claim 8, further comprising:
- one or more programs having instructions which, when executed by the server system, cause:
- the server system automatically sending via a data network the keyword metadata to the second client device for indexing the content item, as modified, at the second client device, based on the metadata sharing rule identifying the second client device.

11. The one or more non-transitory computer-readable media of claim 8, further comprising:
- one or more programs having instructions which, when executed by the server system, cause:
- the server system automatically sending via a data network the keyword metadata to the second client device for indexing the content item, as modified, at the second client device, based on the metadata sharing rule identifying a particular user that holds a user account held with the content management service; and wherein the user account is associated with the second client device.

12. The one or more non-transitory computer-readable media of claim 8, further comprising:
- one or more programs having instructions which, when executed by the server system, cause:
- the server system automatically sending via a data network the keyword metadata to the second client device for indexing the content item, as modified, at the second client device, based on the second client device being a mobile electronic device.

13. The one or more non-transitory computer-readable media of claim 8, further comprising:
- one or more programs having instructions which, when executed by the server system, cause:
- the server system automatically sending via a data network the keyword metadata to the second client device for indexing the content item, as modified, at the second client device, based on the metadata sharing rule identifying the second client device and based on the metadata sharing rule identifying a particular content item type; and
- wherein a type of the content item is the particular content item type.

14. The one or more non-transitory computer-readable media of claim 8, further comprising:
- one or more programs having instructions which, when executed by the server system comprising one or more processors, cause:
- the server system sending the modification to the content item to the second client device.

15. A server computing system for generating and sharing metadata for indexing a synchronized content item, the server computing system comprising:
- one or more processors;
- storage media;
- one or more programs stored in the storage media and configured for execution by the one or more processors, the one or more programs having instructions configured for:
- storing a content item that is synchronized between the server computing system and a first battery-operated client device, the content item hosted with a content management service that operates the server computing system, the first battery-operated client device associated with a first user account held with the content management service;
- based on receiving via a data network a modification to the content item from the first battery-operated client device, automatically generating a keyword metadata for indexing the content item, as modified, according to a metadata generation rule and based on parsing the content item, as modified;
- according to a metadata sharing rule, automatically sending via a data network the keyword metadata to a second client device that is not the first battery-operated client device responsive to receiving a request from the second client device of an acceptance of a request to share the content item with a second user account held with the content management service that is not the first user account, the request to share the content item associated with the first user account; and
- wherein the automatically sending the keyword metadata to the second client device causes the content item, as modified, to be indexed in an inverted file index at the second client device by the keyword metadata.

16. The server computing system of claim 15, further comprising:
- one or more programs stored in the storage media and configured for execution by the one or more processors, the one or more programs having instructions configured for:
- automatically sending via a data network, to the second client device, the keyword metadata and the modification to the content item, in a synchronization exchange between the second client device and the server computing system of the content management service.

17. The server computing system of claim 15, further comprising:
- one or more programs stored in the storage media and configured for execution by the one or more processors, the one or more programs having instructions configured for:
- according to the metadata sharing rule, automatically sending via a data network the keyword metadata to a third client device that is not the first battery-operated client device or the second client device; and
- wherein the automatically sending via a data network the keyword metadata to the third client device causes the content item, as modified, to be indexed in an inverted file index at the third client device by the keyword metadata.

* * * * *